US006720392B2

(12) United States Patent
Scholl et al.

(10) Patent No.: US 6,720,392 B2
(45) Date of Patent: Apr. 13, 2004

(54) AQUEOUS AMINO RESIN BLENDS

(75) Inventors: Frank Scholl, Bad Homburg (DE); Johann Wonner, Rodgan (DE); Wolfgang Scholz, Offenbach (DE)

(73) Assignee: Solutia Germany GmbH & Co. KG, Mainz-Kastel (DE)

( * ) Notice: Subject to any disclaimer, the term of this patent is extended or adjusted under 35 U.S.C. 154(b) by 0 days.

(21) Appl. No.: 10/139,476

(22) Filed: May 6, 2002

(65) Prior Publication Data

US 2003/0065133 A1 Apr. 3, 2003

(30) Foreign Application Priority Data

May 17, 2001 (DE) .......................................... 101 23 948

(51) Int. Cl.$^7$ .......................... C09D 161/20; B31D 1/00
(52) U.S. Cl. .................... 525/515; 525/509; 427/385.5; 427/391; 524/598; 528/258; 528/262; 528/263
(58) Field of Search .............................. 427/385.5, 391; 525/509, 515; 524/598; 528/258, 262, 263

(56) References Cited

U.S. PATENT DOCUMENTS

| 3,352,838 | A | 11/1967 | Toepfl et al. ............ 260/80.73 |
| 4,374,899 | A | 2/1983 | Sanfilippo et al. |
| 4,713,299 | A | 12/1987 | Taylor et al. |
| 4,940,841 | A | 7/1990 | Dickerhof .................... 524/510 |
| 6,261,483 | B1 | 7/2001 | Frank |
| 2001/0051679 | A1 * | 12/2001 | Scholl ........................ 524/211 |

FOREIGN PATENT DOCUMENTS

| DE | 2 309 334 | 8/1974 | |
| DE | 34 03 136 A1 | 8/1984 | |
| DE | 38 37 965 A1 | 5/1990 | |
| DE | 44 39 156 A1 | 5/1996 | |
| DE | 198 35 114 A1 | 2/2000 | |
| EP | 0 913 412 A1 | 5/1999 | |
| EP | 1 152 043 | 11/2001 | .......... C09D/161/32 |
| JP | 55 005967 A | 1/1980 | ........... C08L/61/20 |
| JP | 55 149342 A | 11/1980 | |
| WO | WO 88/06176 A1 | 8/1988 | ............. C09D/3/81 |

OTHER PUBLICATIONS

Kunststoff–Handbuch. vol. 10, Duroplaste (Thermosets), Hanser–Verlag, $2^{nd}$ Edition 1988, p. 464 F., pp. 477 to 479.

* cited by examiner

*Primary Examiner*—Patricia A. Short
(74) *Attorney, Agent, or Firm*—ProPat, L.L.C.

(57) ABSTRACT

An aqueous amino resin blend comprises aliphatic linear, branched or cyclic amines A containing at least one primary, secondary or tertiary amino group, at least one hydroxyl group and 2 to 20 carbon atoms, and amino resins B, and is used as an impregnating resin in the production of finished foils and edgings.

12 Claims, No Drawings

AQUEOUS AMINO RESIN BLENDS

The present invention relates to aqueous amino resin blends comprising as additives aliphatic amines containing at least one amino group and at least one hydroxyl group, the use thereof as impregnating resins, and a process for the reduction of the formaldehyde emission from impregnates by adding such amines to amino resins.

The faces and edges of woodbase materials are coated using coated foils (finished foils) and impregnated cardboards (edgings), respectively (Kunststoff-Handbuch vol. 10, Duroplaste [Thermosets], Hanser-Verlag, $2^{nd}$ ed. 1988, p. 464 f., pp. 477 to 479). These finished foils and edgings are produced by impregnating absorbent papers with amino resins (thermosets) such as urea-formaldehyde and/or melamine-formaldehyde resins, for example, in combination where appropriate with aqueous dispersions of thermoplastic resins such as acrylic dispersions or styrene-acrylic dispersions, drying the coated papers in a stream of hot air and at the same time curing the resins, and then coating the impregnated or resinated papers.

Adequate penetration of the impregnation liquors into the paper is achieved if the resin solution is processed from aqueous or alcoholic dilution. Owing to the high level of cellulose swelling in aqueous systems, the foils and edgings produced from high aqueous dilution are brittle, exhibit a high level of water absorption, and even in the coated state have a surface whose aesthetic appeal is low. The procedure described in DE-A 23 09 334, which uses impregnating liquors diluted with $C_1$ to $C_4$ alcohols, does give foils and edgings having good performance properties but requires cumbersome measures for reprocessing the waste air. The route to a solution that is described in DE-A 44 39 156, modifying melamine resins with guanamines, does make it possible to carry out impregnation from purely aqueous liquors. A disadvantage, however, is the significantly higher cost of the amino resin, resulting from the use of the guanamines. In patent application DE-A 198 35 114, there are claimed methyl-etherified aqueous melamine-formaldehyde resins for producing microcapsules to which ammonia or primary, secondary or tertiary amines are added. There is no reporting of the advantageous effect of (hydroxyalkyl)amines on the reduction of formaldehyde emissions from finished foils and edgings.

In EP-A 0 913 412, non-etherified urea-formaldehyde resins are described which have a mass fraction of melamine in the finished resin of from 1 to 5%, the reaction mixture being neutralized, following complete condensation, by the addition of specific tertiary hydroxyalkylamines (preferably triethanolamine, methyldiethanolamine, and dimethylethanolamine). These resins are used as impregnating resins. There is no reporting of the advantageous effect of (hydroxyalkyl)amines on the reduction of formaldehyde emissions from finished foils and edgings.

Formaldehyde emissions of ready-produced finished foils and edgings are determined following storage under standard climatic conditions (23° C., 50% relative humidity) in accordance with the standard EN 717-2 (FESYP method, gas analysis). Foils and edgings with formaldehyde emission values of less than 3.6 mg/(h·m$^2$) by the FESYP method comply with the limit ("E 1") and are referred to below as E1 edgings. The rates of emission found remain more or less constant even after several weeks of storage under standard conditions. Emissions of formaldehyde are due to the use of urea-formaldehyde and/or melamine-formaldehyde resins in the liquors for impregnating the paper or cardboard sheets and/or in the formulations for coating the foils and edgings. By using particularly low-formaldehyde urea-formaldehyde and/or melamine-formaldehyde resins it is possible to reduce the formaldehyde emissions as measured by the FESYP method (standard conditions) to levels of around 2 mg/(h·m$^2$).

It has surprisingly now been found that when E1 edgings produced in accordance with the prior art with initial formaldehyde emission levels of from 1.0 to 3.5 mg/(h·m$^2$) are stored, especially under nonstandardized climatic conditions at customary summer temperatures and atmospheric humidities, the formaldehyde emissions rise in the course of a few weeks to levels of in some cases much higher than 3.5 mg/(h·m$^2$), and so no longer satisfy the E1 criterion. This unexpectedly high increase in formaldehyde emissions was confirmed by storage under defined conditions in a tropical climate (35° C., 90% relative humidity), with measurement being carried out only after three-day reconditioning under standard conditions following storage under the tropical climate conditions.

From the prior art it is known that the amount of free formaldehyde and also formaldehyde emissions may be reduced by adding formaldehyde scavengers such as urea and urea derivatives, for example. For example, according to DE-A 38 37 965, finished foils and edgings with formaldehyde emissions that are negligible as determined in accordance with DIN 52368 may be produced by adding urea to the melamine-formaldehyde condensation product. No information is given, however, regarding storage behavior, in particular under tropical conditions.

According to DE-A 34 03 136, mixtures of organic hydroxy compounds and an amide are suitable for use as formaldehyde-binding agents in boards made from wood cellulose materials. The use of these mixtures as formaldehyde scavengers in finished foils and edgings is not described. Addition of the mixtures described in DE-A 34 03 136 to amino resins that are used to produce finished foils and edgings leads to a marked deterioration in the flexibility of the finished foils and edgings produced with them. The use of formaldehyde scavengers known from the literature, such as urea, ethyleneurea, and propyleneurea, resulted in finished foils and edgings which did meet the E1 criterion under standard conditions but which greatly exceeded the E1 limit of 3.5 mg/(h·m$^2$) under tropical climate conditions.

It is an object of the present invention to provide modified amino resins for producing films and edgings that can be used to produce finished foils and furniture edgings which have formaldehyde emissions reduced significantly in relation to the prior art when stored, particularly also under tropical conditions, but which retain the required performance properties.

This object is achieved by means of aqueous amino resin blends which comprise as additives, aliphatic linear, branched or cyclic amines containing hydroxyl groups.

This invention therefore relates to a process of reducing the formaldehyde emission from finished foils and edgings, wherein aqueous amino resin blends are used for impregnation which comprise aliphatic linear, branched or cyclic amines A having at least one amino group which may be primary, secondary or tertiary, at least one hydroxyl group and from 2 to 20 carbon atoms, and non-etherified or at least partly etherified amino resins B.

Addition of these amines A brings about a reduction of up to 90% in the formaldehyde emissions from the finished foils or edgings (impregnates) as compared with the same resin without added amine.

The present invention also relates to a method of use of amines A having at least one amino group that may be primary, secondary or tertiary, one hydroxyl group and 2 to 20 carbon atoms, comprising adding these amines A to amino resins, and impregnating paper or cardboard with such modified amino resins to reduce formaldehyde emissions from the impregnates.

The invention also relates to an aqueous amino resin blend comprising aliphatic linear, branched or cyclic amines A having at least one amino group which may be primary, secondary or tertiary, at least one hydroxyl group, and 2 to 20 carbon atoms, and non-etherified or at least partly etherified amino resins B, wherein the amino resins have a mass fraction of melamine of less than 1% or more than 5%, in the case where the amines A comprise tertiary hydroxyalkylamines. It is preferred in this case, that the mass fraction of melamine in the amino resins is at least 7%, particularly preferably at least 10%; or at most 0.9%, particularly preferably at most 0.75%, and especially preferably at most 0.5%.

The invention also relates to an aqueous amino resin blend comprising aliphatic linear, branched or cyclic amines A having at least one amino group which may be primary, secondary or tertiary, at least one hydroxyl group, and from 2 to 20 carbon atoms, and at least partly etherified amino resins B.

Such mixtures or blends when used as impregnating agent for the production of finished foils and edgings lead to impregnates (finished foils and edgings) that are distinguished by their markedly reduced formaldehyde emission.

The present invention also relates to a method of use of the aqueous amino resin blends in the production of finished foils or edgings, comprising impregnating paper or cardboard with the said amino resin blends, and subsequently drying the impregnates.

The amines A have preferably from 4 to 12 carbon atoms. The number of hydroxyl groups in the amines A is preferably at least equal to the number of primary, secondary or tertiary amino groups. Suitable amines A are preferably selected from the group consisting of ethanolamine, diethanolamine, bis-2-hydroxypropylamine, bis-3-hydroxypropylamine, triethanolamine, tris-2-hydroxypropylamine, N-methylethanolamine, N-benzylethanolamine, N,N-dimethylethanolamine, 2-hydroxyethylpiperazine, bis-2-hydroxyethylpiperazine, N,N'-bis(2-hydroxyethyl)diaminoethane, and N,N,N',N'-tetrakis(2-hydroxyethyl)diaminoethane. It is further preferred for the amines A to contain secondary and/or tertiary amino groups, particularly preferably exclusively secondary and/or tertiary amino groups. It is especially preferred that the amines have exclusively secondary amino groups and in particular, the number of hydroxyl groups of these amines is greater by at least 1 than the number of secondary amino groups. Such amines are diethanolamine, bis-2-hydroxypropylamine, bis-3-hydroxypropylamine, N-methylethanolamine, N-benzylethanolamine, 2-hydroxyethylpiperazine, and N,N'-bis(2-hydroxyethyl)diaminoethane.

The amino resins B are water-soluble melamine-formaldehyde resins, urea-formaldehyde resins or mixed melamine-urea condensates which are non-etherified or at least partly etherified with aliphatic linear or branched alcohols, in particular with $C_1$ to $C_4$ alcohols. The expression "at least partly etherified" here means that at least 10% of the groups originating from the addition of formaldehyde onto the amino resin former (methylol groups, N-methylene groups and alkoxymethyl groups) are present in the form of alkoxymethyl groups. In the compositions of the invention it is also possible to use those melamine resins in which a fraction (up to 20% of their mass) of the melamine has been replaced by other aminotriazines such as acetoguanamine, caprinoguanamine or benzoguanamine. Preferred resins, however, contain less than 10%, in particular less than 5%, measured on the same scale, of aminotriazines which are different from melamine.

In the amino resins B, the amount of substance of aminotriazines, divided by the sum of the amounts of substance of aminotriazines and urea, is from 0 to 1 mol/mol. The content of bonded formaldehyde per each —$NH_2$ group in the amino resins B, expressed as the ratio of the amount of substance of N-methylol groups and the sum of the amounts of substance of free and of (singly or doubly) methylolated amino groups, is from 0.5 to 2.0 mol/mol, preferably from 0.55 to 1.95 mol/mol, and particularly preferred from 0.6 to 1.9 mol/mol. The content of alkoxy groups originating from the etherifying alcohol, expressed as the ratio of the amount of substance of alkoxy groups and the sum of the amount of substance of free, methylolated, and alkoxymethylated amino groups in the amino resins B, is from 0.0 to 2.0 mol/mol, preferably from 0.1 to 1.95 mol/mol, and particularly preferred from 0.15 to 1.9 mol/mol. Optionally, the resins are at least partly etherified with the aforementioned alcohols, especially methanol, ethanol, n-butanol and isobutanol. Particular preference is given to methanol-etherified amino resins.

The preparation of the amino resins B is widely known. First of all, methylolation and condensation are carried out by adding amino resin formers (melamine, urea, the above-mentioned other aminotriazines where appropriate) to formaldehyde at a pH of from 7 to 10 and a temperature of from 40 to 110° C., after which the etherifying alcohol is optionally added and reaction is optionally continued at a pH from 1 to 7 and at a temperature from 30 to 80° C. The condensation and etherification conditions are guided by the level of water dilutability that is desired for the resin, which is at least 1 part by weight resin to 5 parts by weight deionized water, and by the required penetration properties.

The amino resin blends of the invention may further comprise additives, especially polyethylene glycols C1 and/or aqueous dispersions of a copolymer C2 which preferably contains a mass fraction of at least 50% of units derived from (hydroxy)alkyl (meth)acrylates and/or (meth)acrylic acid. (Hydroxy)Alkyl (meth)acrylates are meant to include, in this context, hydroxyalkyl methacrylates, hydroxyalkyl acrylates, alkyl methacrylates and alkyl acrylates. Furthermore, additions of urea (0.5 to 5 cg/g which is equivalent to 0.5 to 5 g/(100 g)) and polyfunctional alcohols containing from 3 to 6 hydroxyl groups, such as trimethylolpropane, erythritol, pentaerythritol, dimethylolpropane, dipentaerythritol, xylitol, sorbitol and mannitol (0.5 to 7 cg/g which is equivalent to 0.5 to 7 g/(100 g)), have proven advantageous. The stated amount for addition is in each case the mass of the addition based on 100 g of the (undiluted) amino resin. As these additives are added after the condensation of the amino resin, they are not incorporated into the condensation resin.

Suitable polyethylene glycols C1 are oligomers or polymers having (number-average) molar masses $M_n$ of up to about 2000 g/mol. Preference is given to liquid polyethylene glycols having molar masses $M_n$ of from 200 to 600 g/mol. They are used where appropriate in amounts such that the ratio of the mass of C1 to the mass of the solids fraction in the solution or dispersion of the amino resin is between 5 and 50 g/(100 g), preferably from 15 to 45 g/(100 g).

The copolymer dispersions C2 are dispersions of acrylic copolymers in water, preparable for example by emulsion copolymerization of olefinically unsaturated monomers, the monomer mixture used to prepare them preferably containing a predominant fraction (more than 50% of its mass) of acrylic monomers, i.e., acrylic or methacrylic acid and derivatives thereof, especially esters with aliphatic alcohols having from 1 to 10 carbon atoms, and esters with aliphatic polyhydroxy compounds having from 2 to 10 carbon atoms and at least two hydroxyl groups per molecule. Preferred acrylic monomers among the esters are methyl, ethyl, n-butyl, t-butyl, hexyl and 2-ethylhexyl (meth)acrylate, hydroxyethyl (meth)acrylate and hydroxypropyl (meth)acrylate. It is also possible to copolymerize monomers which can be copolymerized, such as styrene and other aromatic vinyl compounds, nitriles of olefinically unsaturated acids such as (meth)acrylonitrile, esters or monoesters of olefinically unsaturated dicarboxylic acids such as maleic acid in particular, vinyl esters such as vinyl acetate or vinyl versatate, vinyl halides or vinyl ethers. These dispersions normally have mass fractions of solids of from 25 to 85%; they are added to the amino resin or else only to the impregnation liquor. The ratio of the mass of copolymer in the copolymer dispersion C2 to the mass of the amino resin B in its aqueous solution or dispersion can be (5 to 150 g): 100 g, preferably (20 to 140 g): 100 g, in the composition.

The finished foils and edgings produced using the amino resin blends of the invention are distinguished by up to 90% reductions in formaldehyde emission under standard and tropical conditions as compared with the prior art. The performance properties of the amino resin blends, and the properties of the finished foils and edgings so produced, are otherwise equivalent to those of the prior art.

In the examples to follow, the invention is further illustrated. There, as well as in the preceding text, all data with the unit "%" refer to mass fractions (ratio of the mass of the substance in question, and the mass of the mixture), if not expressly stated otherwise. Values for a concentration in "%" are mass fractions of the dissolved substance in the solution (ratio of the mass of solute, divided by the mass of the solution).

EXAMPLES

Example 1

Aqueous, Partly Methanol-Etherified Melamine-Formaldehyde Resin

A 30 l laboratory vessel with stirrer, reflux condenser and thermometer was charged with 6717 g (87.2 mol) of 39% strength aqueous formaldehyde and this initial charge was heated to 68° C. Then 31.5 ml of 2 N sodium hydroxide solution were added, followed immediately by 3450 g (27.4 mol) of melamine. Because of the exothermic reaction of melamine and formaldehyde, the mixture rose in temperature to about 83° C. and was held at this temperature until all of the melamine has dissolved. It was then cooled to 55° C. and 16560 g (517 mol) of methanol and 30 ml of 53% strength nitric acid were added. The reaction mixture was heated to 59° C. and stirred at this temperature until the mixture became clear. After a further 30 minutes, the reaction was terminated by adding about 140 ml of 2 N NaOH. The pH was adjusted to 10. Excess methanol was removed by distillation under reduced pressure (water jet pump, about 20 mbar=about 20 hPa) and the mass fraction of solids of the resin solution was adjusted to about 75% (measured as the residue of 2 g of the resin solution after drying at 120° C. for 1 h on a glass dish). The resin solution had the following characteristics: mass fraction of solids: 75%, viscosity at 23° C.: 480 mPa·s, mass fraction of free formaldehyde: 0.17%, water dilutability: unlimited.

Example 2

Performance Testing

The amounts of polyethylene glycol 400 ("PEG", number-average molar mass $M_n$=400 g/mol), p-toluenesulfonic acid (TSA) and the further indicated auxiliaries indicated in the table below were added to portions of 100 g of the resin solution from example 1. Each impregnation liquor was adjusted to a mass fraction of solids (nonvolatiles content, NVC) of 75% (measured as the dry residue after drying at 120° C. for 1 h in a small glass dish) by adding DI (fully deionized) water. These resin liquors were applied to papers by knife coating with a mass per unit area of approximately 200 g/m² (typical edgebanding cardboard) and the impregnated papers were then dried at 180° C. (in a forced air oven) for 90 seconds. The resin addon was 38 to 42% (mass of solid resin based on the mass of the dry paper before impregnation).

For determination of the formaldehyde emissions, samples of the impregnated paper (edging samples) were conditioned for 3 days under standard conditions (23° C., 50% relative humidity) prior to each measurement. For determining the formaldehyde emissions under tropical conditions, the edging samples were stored at 35° C. and 90% relative humidity for 1 week, and were also reconditioned for 3 days in each case under standard conditions prior to the actual measurement. The formaldehyde emissions (F emissions) were measured in accordance with EN 717-2.

The formaldehyde emissions indicated in the table are listed as averages of the 1-hour to 4-hour values (average of the emission during the first hour, of the emission 5 during the second hour, etc.):

TABLE 1

Compositions of the impregnating resins (in each case relative to 100 g of the resin solution from example 1) and formaldehyde emissions

|  | PEG | TSA | Urea | Sorbitol* | Auxiliary | F emission standard conditions mg/(h · m²) | F emission tropical conditions mg/(h · m²) |
|---|---|---|---|---|---|---|---|
| Ex. 2.1 | 26 g | 1.3 g | 1.1 g | 1.5 g | 8.7 g TEA | 0.24 | 0.80 |
| Ex. 2.2 | 26 g | 1.3 g | 1.1 g | 1.5 g | 8.7 g DEA | 0.13 | 0.28 |
| Ex. 2.3 | 28 g | 1.3 g | 1.1 g | 1.5 g | 7.0 g DEA | 0.16 | 0.28 |
| Ex. 2.4 | 30 g | 1.3 g | 1.1 g | 1.5 g | 5.2 g DEA | 0.20 | 0.34 |
| Ex. 2.5 | 31 g | 1.3 g | 1.1 g | 1.5 g | 3.5 g DEA | 0.22 | 0.45 |
| Ex. 2.6 | 33 g | 1.3 g | 1.1 g | 1.5 g | 1.7 g DEA | 0.30 | 0.69 |
| Ex. 2.7 | 26 g | 1.3 g | 1.1 g | 1.5 g | 8.7 g DMEA | 0.46 | 1.44 |
| Ex. 2.8 | 31 g | 1.3 g | — | — | 4.7 TEA | 0.43 | 0.86 |
| Ex. 2.9 | 34.6 g | 1.3 g | — | — | 1.5 DEA | 0.31 | 0.70 |

TABLE 1-continued

Compositions of the impregnating resins (in each case relative to 100 g of the resin solution from example 1) and formaldehyde emissions

| | PEG | TSA | Urea | Sor-bitol* | Auxi-liary | F emission standard conditions mg/(h · m$^2$) | F emission tropical conditions mg/(h · m$^2$) |
|---|---|---|---|---|---|---|---|
| Comp. ex. 2.1 | 35 g | 1.3 g | — | — | — | 0.75 | 2.02 |
| Comp. ex. 2.2 | 26 g | 1.3 g | 1.1 g | 1.5 g | 8.7 g TMP | 0.47 | 1.47 |
| Comp. ex. 2.3 | 26 g | 1.2 g | 1.1 g | 1.5 g | — | 0.59 | 1.80 |

Key:
*sorbitol, 70% strength solution in water
DEA = diethanolamine
DMEA = N,N-dimethylethanolamine
TEA = triethanolamine
TMP = trimethylolpropane The formaldehyde emission values for examples 2.1 to 2.9 reveal the particularly strongly formaldehyde-reducing effect of adding diethanolamine or triethanolamine. This effect is more marked with the secondary amine diethanolamine, in comparison with the tertiary amine triethanolamine. As compared with comparative example 3, the reduction in formaldehyde emissions, depending on the amount and nature of the added amine, is from 27 to 84%.

The performance suitability of the resin blends was tested. The pot life is the time taken for an impregnation liquor stored at 30° C. to attain a viscosity (measured as the flow time from a 4 mm cup, DIN 53211, at 23° C.) of more than 60 s or for the penetration time with a defined test paper to have risen to more than 70 s. The flexibility of the edgings was assessed by means of the bending test at room temperature. The parameter stated is the bending radius at which the edge still just does not break. The split resistance is a measure of the strength of the impregnated edging after the resin is cured. It is tested by introducing a slit at least 10 cm long into the middle of an edging strip about 30 cm long, with its longer edge running parallel to the orientation of the fiber, the slit being introduced parallel to the longer edge. The maximum splitting (dividing of the paper transverse to the slit, as a result of extraction of individual fibers) is reported as the depth in mm). The resin composition was indicated in table 1.

TABLE 2

Performance parameters and pot life

| | Pot life at 30° C. in h | Penetration time at 70° C. in s | Bending radius in mm | Split resistance in mm |
|---|---|---|---|---|
| Ex. 2.1 | >24 | 1 | 6 | 2 |
| Ex. 2.2 | >24 | 5 | 6 | 3 |
| Ex. 2.3 | >24 | 1 | 6 | 2–3 |
| Ex. 2.4 | >24 | 1 | 6 | 2–3 |
| Ex. 2.5 | >24 | 1 | 6 | 2–3 |
| Ex. 2.6 | >24 | 1 | 6 | 2–3 |
| Ex. 2.7 | >24 | 2 | 6 | 2 |
| Comp. ex. 2.1 | 4–5 | 2 | 6 | 2–3 |
| Comp. ex. 2.2 | 3 | 3 | 8 | 2–4 |
| Comp. ex. 2.3 | — | 150 | 8 | 3–4 |

The resins of the invention from examples 2.1 to 2.7 result in resins which were in accordance with the prior art in terms of flexibility (bending radius) and split resistance. Their pot life, i.e., the time during which the impregnation liquor can be processed following its preparation, is much longer than that of the prior art resins (comparative examples 2.1 to 2.3).

Example 3

150 g of a commercial aqueous, non-etherified urea formaldehyde resin (with a mass fraction of solids of about 55%, a ratio of formaldehyde to urea of 1.9 mol/mol, as determined by 13 C-NMR, a water compatibility at 20° C. in excess of 25 ml/g, and a viscosity as determined by the efflux time according to DIN 53 211 at 23° C. of 13 s) were mixed with the additives as listed in table 3 (M=aqueous acrylate dispersion ®Mowilith VDM 7830, mass fraction of solids about 50%, Clariant GmbH; solution of ammonium chloride in water, concentration=25%; S=sorbitol, aqueous solution with a mass fraction of solids of 70%; DEA= diethanolamine; TEA=triethanolamine); the mixture was applied with a doctor blade to a paper with a mass per unit area of 60 g/m$^2$, and the impregnated paper was subsequently dried for 40 seconds in a convection oven at 160° C. The resin addon was 27 to 29% (mass of solid resin based on the mass of the dry paper before impregnation). A commercial acid-curing paint (Treffert GmbH, grade 136-07, together with curing agent 176-01; on the basis of aqueous polyols with amino resins) was then applied to the impregnated paper with a doctor blade, the loading being up to 14 g/m$^2$, and dried at 155 to 160° C.

The samples were conditioned for three days under standard conditions (23° C., 50% relative humidity) prior to each measurement. Formaldehyde emission was determined according to the standard EN 717-2. Averages of the values 20 taken after 1 hour etc. through that taken after 4 hours are listed in table 3.

TABLE 3

Composition of urea resin blends and performance

|  | Example 3.1 | Example 3.2 | Example 3.3 | Example 3.4 | comparison |
|---|---|---|---|---|---|
| acrylate dispersion g | 170.1 | 171.3 | 169.3 | 169.9 | 168.3 |
| water g | 188.1 | 190.5 | 186.17 | 187.1 | 184.5 |
| ammonium chloride solution g | 1.68 | 1.69 | 1.67 | 1.7 | 1.66 |
| sorbitol g | 1.7 | 1.7 | 1.7 | — | — |
| amine (kind) g | DEA 1.7 | TEA 5.0 | DEA 3.2 | DEA 2.5 | — |
| formaldehyde emission in mg/(h · m$^2$) | 2.2 | 2 | 1.8 | 1.5 | 2.5 |

The effect of the addition of amine can be seen from the values for formaldehyde emission. It is also apparent that the effect of the secondary amine, DEA, is clearly superior to that of the tertiary amine, TEA.

No change in the parameters relevant for the application properties is noted due to the addition of the additives, viz. viscosity as measured by the efflux time according to DIN 53 211 at 23° C., and penetration as determined on a test paper, even after storage of the impregnation liquors at 30° C. for over 7 hours. As the storage stability of urea resins is, however, impaired upon addition of amines, it is recommended to add the amines only directly before starting the impregnation.

Example 4

Partially Etherified Urea Formaldehyde Resin 623.7 g of a 39% strength aqueous formaldehyde solution, 0.216 g of a 50% strength aqueous solution of sodium hydroxide, and 162.2 g of urea were charged and heated to 80° C. Upon reaching 65° C., 0.864 g of the same sodium hydroxide solution were added, whereupon exothermic heating by approximately 7° C. was observed. Upon reaching 80° C., methylolation was carried out for 15 minutes, and then the reaction mass was cooled to 58° C. Next, 1038 g of methanol were added within 20 minutes. Care was taken to make sure that the temperature never fell below 40° C. After the addition of methanol was completed, 4.81 g of a 53% strength solution of nitric acid were added. Again, a rise in temperature of 7° C. due to the exothermic reaction was observed. After heating to 50 ° C., etherification was continued at 50° C. for 60 minutes. Subsequently, 2,376 g of 50% strength aqueous sodium hydroxide solution were added, the reaction solution was cooled in an ice bath to 25° C., and pH was adjusted to from 9.6 to 9.7. In a rotational evaporator, the solution was reduced to approximately 432 g. By addition of fully desalinated water, the mass fraction of solids was set to 75%, and pH was adjusted to between 9.5 and 10.5.

The resin solution had a mass fraction of solids of 74.6%, a pH of 9.7, a mass fraction of free formaldehyde of 0.7%, the viscosity as measured at 23° C. was 125 mPa·s. According to $^{13}C$ NMR measurement, the ratio $n_C:n_F:n_{MeO}$ of amounts of substance of urea, bonded formaldehyde, and methoxy groups was 1 mol:1.94 mol:1.58 mol.

Example 5

Evaluation 100 g of the resin solution of Example were each mixed with the additives (polyethylene glycol PEG, para-toluene sulphonic acid TSA, etc.) as listed in table 4 below. The comparison impregnating solution contains neither amine nor sorbitol. By addition of fully desalinated water, each impregnation solution was set to a mass fraction of solids (nonvolatiles) of 75% (as determined by drying at 120° C. for 1 hour in a glass dish). These impregnating liquors were applied to paper having a mass by unit area of 200 g/m$^2$ (usual edging cardboard) with a doctor blade, the impregnated paper was dried for 90 seconds at 180° C. in a convection oven. The resin addon was 38 to 42% (mass of solid resin per mass of dry unimpregnated paper). Before determining the formaldehyde emission, the edging samples were conditioned for 3 days in standard conditions (23° C., 50% relative humidity). Formaldehyde emission was determined according to the EN 717-2 standard. Formaldehyde emission values listed in table 4 are averages of the values for 1 hour until 4 hours.

TABLE 4

Composition of impregnating liquors and formaldehyde emission

|  | PEG | TSA | S | amine | formaldehyde emission standard conditions mg/(h · m$^2$) |
|---|---|---|---|---|---|
| example 5.1 | 36 g | 3.3 g | 1.7 g | 2.0 g DEA | 1.1 |
| example 5.2 | 36 g | 3.3 g | 1.7 g | 3.0 g TEA | 1.3 |
| example 5.3 | 36 g | 3.3 g | — | 2.0 g DEA | 1.2 |
| comparative example 5 | 36 g | 3.3 g | — | — | 1.7 |

PEG = polyethylene glycol, ca. 400 g/mol;
S = sorbitol, 70% strength aqueous solution;
DEA = diethanol amine;
TEA = triethanol amine The effect of the amines in reduction of formaldehyde emission can be clearly seen. The secondary amine, DEA, is more effective than the tertiary amine, TEA.

What is claimed is:

1. A process for the reduction of formaldehyde emission from finished foils and edges, comprising the steps of impregnating absorbent papers with aqueous amino resin blends, and drying the impregnates, wherein the aqueous amino resin blends comprise aliphatic linear, branched or cyclic amines A having at least one secondary amino group, at least one hydroxyl group, and from 2 to 20 carbon atoms, and non-etherified or at least partly etherified amino resins B.

2. The process of claim 1 wherein the amines A have exclusively secondary amino groups.

3. The process of claim 1 wherein in the amines A, the number of hydroxyl groups is at least equal to the number of amino groups.

4. The process of claim 1 wherein the amines A are selected from the group consisting of diethanolamine, bis-2-hydroxypropylamine, bis-3-hydroxypropylamine, N-methylethanolamine, N-benzylethanolamine, and 2-hydroxyethylpiperazin.

5. The process of claim 1 wherein the amino resins B have a mole fraction of aminotriazines, based on the sum of the amounts of substance of aminotriazines and urea, of from 0 to 1 mol/mol, a content of bonded formaldehyde per amino group of from 0.5 to 2.0 mol/mol, and a content of alkoxy groups originating from the etherifying alcohol per amino group of from 0.0 to 2.0 mol/mol.

6. The process of claim 5, wherein the content of alkoxy groups originating from the etherifying alcohol per amino group is at least 0.1 mol/mol, and wherein the alkoxy groups are selected from the group consisting of methoxy, ethoxy, n-butoxy, and iso-butoxy groups.

7. The process of claim 1 wherein the aqueous amino resin blends additionally comprise a polyethylene glycol C1 with a number average molar mass of up to approximately 2000 g/mol.

8. The process of claim 1 wherein the aqoeous amino resin blends additionally comprise a copolymer C2, which has a mass fraction of at least 50% of units derived from (hydroxy)alkyl (meth)acrylates and/or (meth)acrylic acid.

9. The process of claim 1 wherein the aqueous amino resin blends additionally comprises urea, the ratio of the mass of added urea to the mass of the amino resin being from 0.5 to 5 cg/g.

10. The process of claim 1 wherein the aqueous amino resin blends additionally comprise a higher functional alcohol with from 3 to 6 hydroxyl groups, the ratio of the mass of the alcohol to the mass of the amino resin being from 0.5 to 7 cg/g.

11. A process for the production of finished foils or edgings, comprising the steps of impregnating absorbent paper or cardboard with aqueous amino resin blends, and subsequently drying the impregnates, wherein the aqueous amino resin blends comprise aliphatic linear, branched or cyclic amines A having at least one secondary amino group, at least one hydroxyl group, and from 2 to 20 carbon atoms, and non-etherified or at least partly etherified amino resins B.

12. Finished foils and edgings, obtained by the process of claim 11.

* * * * *